US006901754B2

(12) United States Patent
Jervis

(10) Patent No.: US 6,901,754 B2
(45) Date of Patent: Jun. 7, 2005

(54) POWER CONSERVING HYDRAULIC PUMP BYPASS COMPENSATOR CIRCUIT

(75) Inventor: Mark J. Jervis, Merseyside (GB)

(73) Assignee: HUSCO International, Inc., Waukesha, WI (US)

( * ) Notice: Subject to any disclaimer, the term of this patent is extended or adjusted under 35 U.S.C. 154(b) by 40 days.

(21) Appl. No.: 10/676,674

(22) Filed: Oct. 1, 2003

(65) Prior Publication Data

US 2005/0072145 A1 Apr. 7, 2005

(51) Int. Cl.[7] .............................................. F16D 31/02
(52) U.S. Cl. .......................................... 60/468; 60/430
(58) Field of Search .......................... 60/468, 430, 452

(56) References Cited

U.S. PATENT DOCUMENTS 3,385,312 A 5/1968 Kinnamon et al.
3,834,163 A 9/1974 Wilke
3,868,821 A * 3/1975 Ratliff et al. ................. 60/468
3,916,624 A * 11/1975 Machens et al. .............. 60/468
3,971,216 A * 7/1976 Miller ......................... 60/452
4,164,119 A 8/1979 Parquet
4,759,183 A 7/1988 Kreth et al.
5,063,739 A 11/1991 Bianchetta et al.
5,083,428 A 1/1992 Kubomoto et al.
5,101,627 A 4/1992 Fujii et al.
5,115,835 A 5/1992 Ueno
5,289,680 A 3/1994 Obe et al.
5,540,050 A * 7/1996 Krupowicz .................. 60/430

* cited by examiner

*Primary Examiner*—Edward K. Look
*Assistant Examiner*—Michael Leslie
(74) *Attorney, Agent, or Firm*—George E. Haas; Quarles & Brady LLP

(57) ABSTRACT

In a hydraulic system that has first and second pumps, a pressure compensation circuit is provided to unload the output of the second pump when its operation is not required. The unloading reduces the power demanded of the engine that drives the pumps thus conserving energy. The first pump is directly connected to a supply line and a back flow check valve couples the second pump to the supply line. When pressure in the supply line is significantly greater than the load pressure of the actuators powered by the hydraulic fluid a bypass compensator valve opens to provide a path between the outlet of the second pump and the tank line. This action unloads the second pump and reduces its demand for engine power.

20 Claims, 2 Drawing Sheets

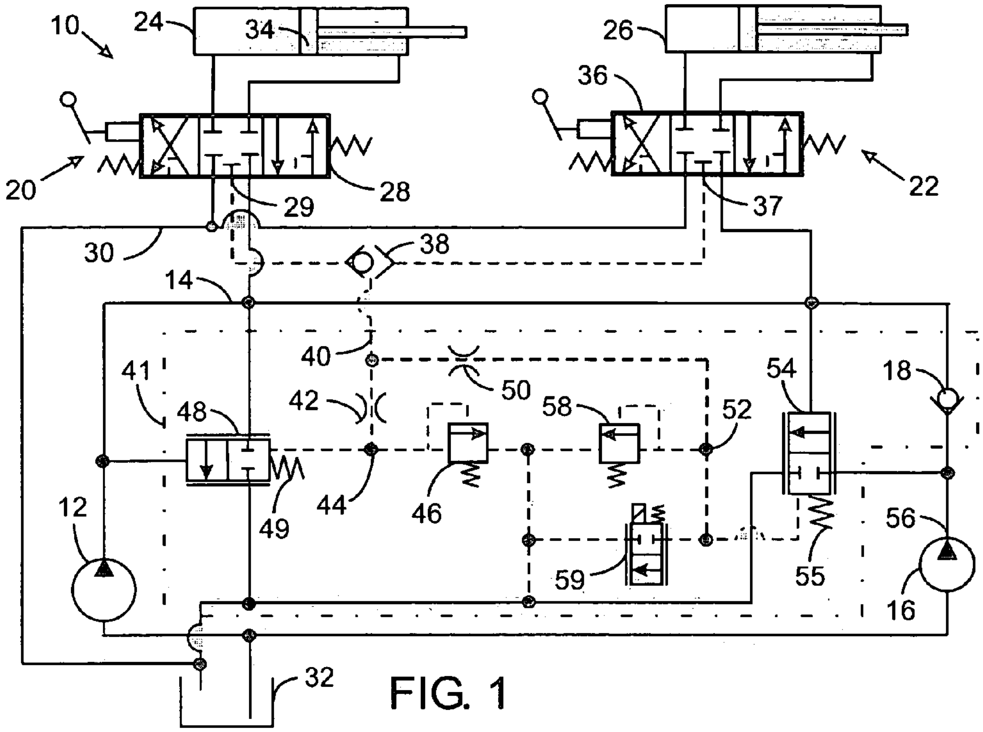
FIG. 1
FIG. 2
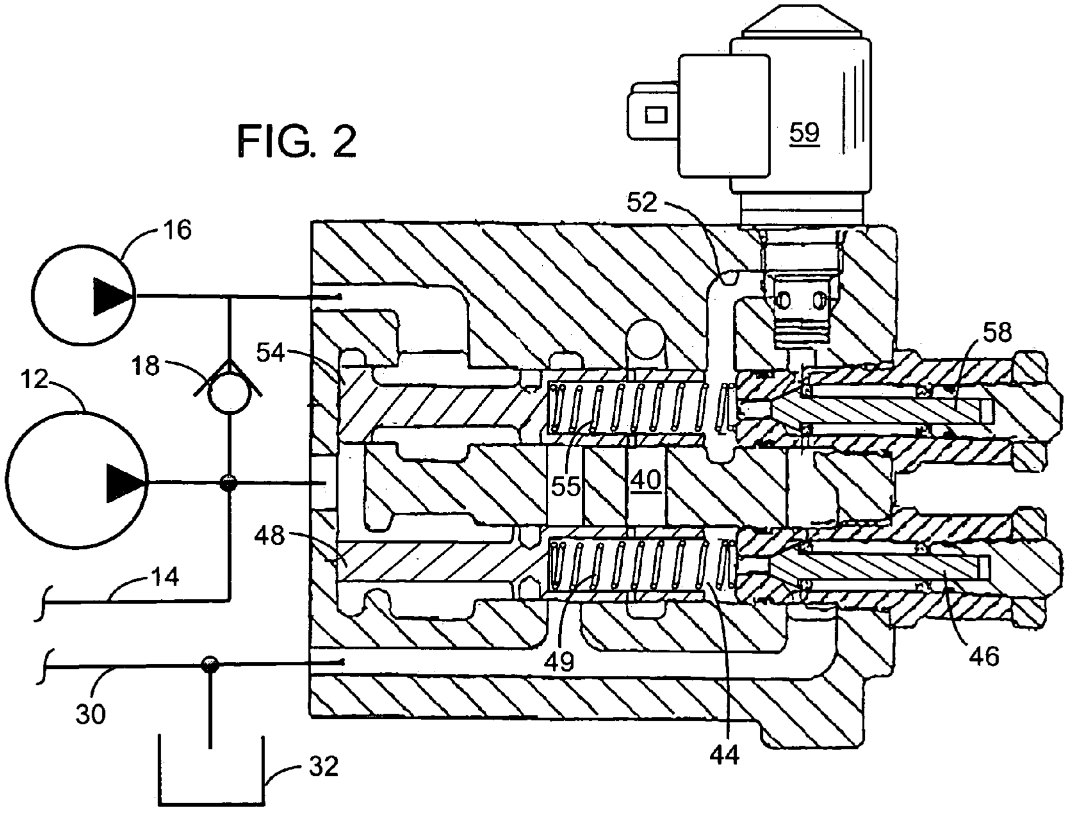

POWER CONSERVING HYDRAULIC PUMP BYPASS COMPENSATOR CIRCUIT

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to hydraulic systems which have multiple pumps connected to a common supply line, and particularly to mechanisms for unloading fluid supplied by one of the pumps when the output of that pump is not required.

2. Description of the Related Art

Numerous types of machines have members which are moved by a hydraulic system. Specifically, a member is driven by an actuator, such as a hydraulic cylinder and piston arrangement, that receives pressurized fluid via a proportional control valve. The control valve is opened varying degrees to proportionally control the rate the fluid flows to or from the associated actuator, thereby moving the machine member at different speeds, as desired by the user.

It is common practice on a tractor loader/backhoe and similar machines to have two fixed displacement hydraulic pumps driven on a common shaft by the machine's engine. In many cases, one of the pumps has its working pressure reduced under certain circumstances in order that the hydraulic horsepower does not exceed the horsepower available from the engine or transmission system. This action, known as "pump unloading", can be set to occur upon a given event, usually at a certain level of pressure in the main system. Hence this device can be controlled by a relief valve, which directs the pump output flow back to the reservoir at lower pressure.

Hydraulic systems often control the unloading by producing a load-sense signal, which indicates the greatest load applied to the different hydraulic services on the machine. In a system with fixed displacement pumps, the load-sense signal operates a variable relief valve or bypass compensator that opens flow path from the pumps to system reservoir. This single compensator valve maintains the combined pump pressure a fixed amount above the load-sense pressure as determined by a spring force acting on that valve. This pressure difference is often referred to as the "margin." If the flow required at the service ports of the control valves is greater than or equal to the combined capacity of the pumps, then the unloading path from the pump to tank is closed off. At this point the margin decays below the level set by the spring and is dependent upon the size of the opening which is presented to the downstream pump.

The present inventor has recognized that for optimal engine power savings, it is desirable to provide independent unloading for each pump in a dual pump system and have one pump be subordinate to the other.

SUMMARY OF THE INVENTION

A pressure compensation circuit is provided for a hydraulic system that controls flow of fluid to at least one hydraulic service connected to a supply line and a return line. The supply line is fed fluid from a primary pump and a secondary pump that is coupled to the supply line by a backflow prevention check valve. A load-sense circuit senses the load pressure at each hydraulic service.

The pressure compensation circuit comprises a first bypass compensator valve that selectively provides a path between the supply line and the return line when pressure in the supply line is greater than pressure in the load-sense circuit by at least a first amount. A second bypass compensator valve selectively provides a path between an outlet of the secondary pump and the return line when pressure in the supply line is greater than pressure in the load-sense circuit by at least a second amount. The second amount is less than the first amount so that the second bypass compensator valve opens under lower pressure in the supply line than the first bypass compensator valve.

One type of hydraulic system has a load-sense circuit that produces a pressure on a load-sense line corresponding to a greatest load among all of the hydraulic services. For this system, the pressure compensation circuit includes a first orifice coupling the load-sense line to a first node and a second orifice coupling the load-sense line to a second node. A first bypass compensator valve selectively provides a path between the supply line and the return line in response to pressure in the supply line being the first amount greater than pressure at the first node. A second bypass compensator valve selectively provides a path between the second outlet of the secondary pump and the return line in response to pressure in the supply line being the second amount greater than pressure at the second node. The second bypass compensator valve opens before the first bypass compensator valve.

Another type of hydraulic system has a load-sense circuit in which pressure in a first load-sense line indicates the load at one hydraulic service and pressure in a second load-sense line indicates the load pressure at another hydraulic service. For this system, the pressure compensation circuit includes a first orifice coupling the first load-sense line to a first node and a second orifice coupling the second load-sense line to a second node. A third orifice is connected between the first and second load-sense lines. A first bypass compensator valve selectively provides a path between the supply line and the return line in response to pressure in the supply line being greater than pressure at the first node. A second bypass compensator valve selectively provides a path between the outlet of the secondary pump and the return line in response to pressure in the supply line being greater than pressure at the second node.

BRIEF DESCRIPTION OF THE DRAWINGS

FIG. 1 is a schematic diagram of a hydraulic system according to the present invention;

FIG. 2 is cross sectional view through an assembly of pressure compensation components of the hydraulic system.

DETAILED DESCRIPTION OF THE INVENTION

Figure 3:
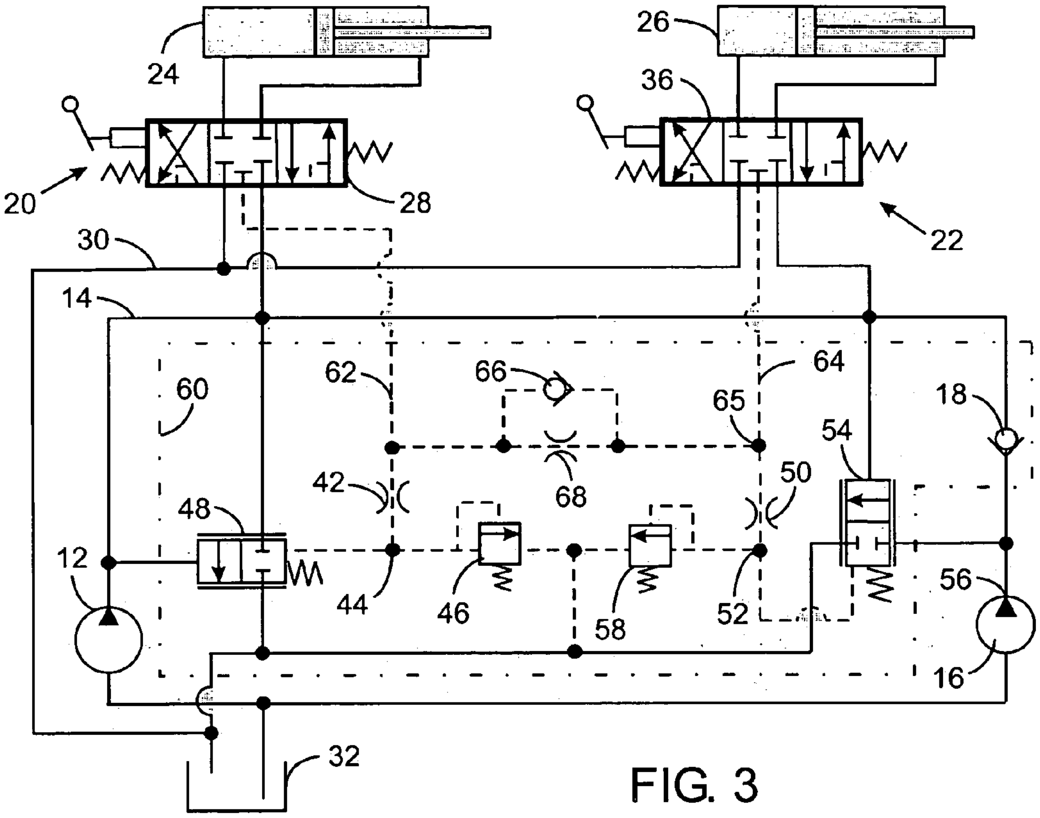
FIG. 3 is a schematic diagram of a second hydraulic system according to the present invention.

With initial reference to FIG. 1, a hydraulic system 10 has a primary pump with an output connected to a supply line 14 and a secondary pump 16 having an output coupled to the supply line by a backflow check valve 18. Both pumps 12 and 16 are fixed displacement types being driven by the engine of an off-highway vehicle, for example. The supply line conveys pressurized hydraulic fluid to several services, or hydraulic functions, 20 and 22 on the machine. One service 22 has a first hydraulic cylinder 24 that moves a member on the machine and the other service 24 includes a second hydraulic cylinder 26 that drives a different machine member.

The flow of hydraulic fluid to and from the first cylinder 24 is proportionally metered by a first directional control valve 28. This three-position (or four-position) valve selectively connects the supply line 14 to one chamber of the first cylinder and connects the other cylinder chamber to a return line 30 the leads to the reservoir, or tank, 32 of the hydraulic system. Which one of the chambers of the first cylinder 24 receives the pressurized fluid determines the direction that the piston 34 in the cylinder moves and thus the direction of motion of the associated member of the machine. The flow of hydraulic fluid to and from the second hydraulic cylinder 26 is metered in a similar manner by a second directional control valve 36 that also is connected to the supply line 14 and the return line 30.

Each of the first and second directional control valves 28 and 36 has a load-sense port 29 and 37, respectively, the pressure at which corresponds to the load pressure from the associated hydraulic cylinder 24 and 26. These load-sense ports are connected to a conventional shuttle valve 38 which selectively applies the greater of those load pressures to a load-sense line 40 as a load sense pressure. In a more complex machine, the load-sense ports from other services are connected by cascaded shuttle valves to the load-sense line 40.

The load-sense line 40 is coupled to a pressure compensation circuit 41. Specifically, a first orifice 42 couples the load-sense line 40 to a first node 44. A spool or poppet type, first bypass compensator valve 48 controls a fluid path between the supply line 14 and the return line 30 in response to pressures at the first node 44 and the supply line. As will be described, the first bypass compensator valve 48 is biased closed by a spring 49 and opens when the supply line pressure is greater than the combined force of that spring and the pressure at the first node 44. A load-sense pressure relief valve 46 connects the first node 44 to the return line 30 to relieve excessively high pressure from acting on the first bypass compensator valve 48.

The load-sense line 40 also is coupled by a second orifice 50 to a second node 52. A spool or poppet type, second bypass compensator valve 54 controls a fluid path between the outlet 56 of the secondary pump 16 and the return line 30 in response to pressure at the second node 52 and the supply line pressure. As will be described, the second bypass compensator valve 54 is biased closed by a spring 55 and opens when the supply line pressure from both pumps is greater that the combined force of that spring and the pressure at the second node 52. The biasing springs 49 and 55 of the bypass compensator valves are different, with the first bypass compensator valve 48 having a higher spring force than the second bypass compensator valve 54. Thus the second bypass compensator valve 54 opens at a lower pressure differential than the first bypass compensator valve 48. An unloader relief valve 58 connects the second node 52 to the return line 30 to relieve excessively high pressure from acting on the second bypass compensator valve 54.

The operation of the pressure compensation circuit 41 can be understood by first assuming that the pumps 12 and 16 are running and neither service 20 or 22 is active, so there is no load-sense pressure signal from the directional control valves 28 and 36. As a result, the pump pressure in the supply line 14 acts on the first bypass compensator valve 48 against the force of the spring 49 thereby pushing the valve spool into an open position. The degree to which the first bypass compensator valve 48 opens is dependent upon a number of factors, including the characteristics of the valve's metering notches and the spring force. Hence the pump output flow into the supply line 14 passes to tank 32 at a pressure related to the spring 49 and metering notches of the first bypass compensator valve 48. This pressure in the supply line 14 also is sensed by the spool in the second bypass compensator valve 54, which pushes that valve's spool to open a relatively large path for the second pump output to pass to the tank 32. Hence, the output flow from the secondary pump 16 passes to the tank at a lower pressure than the output flow from the primary pump 12. The check valve 18 prevents fluid in the supply line 14 from flowing through the open second bypass compensator valve 54.

When one or both of the directional control valves 28 and 36 is operated, a load-sense pressure is generated in line 40 and acts on the spring ends of the spools in both bypass compensator valves 48 and 54. In response, the first bypass compensator valve 48 closes down in order for the primary pump 12 to generate an output pressure equal to the load-sense pressure plus the effect of the compensator spring 49. In this case, the first bypass compensator valve 48 fixes the margin, provided that flow to the active service is less than the capacity of the primary pump 12. The fluid flow passing to the tank 32 via the first bypass compensator valve 48 is equal to the flow from the pumps minus the flow passing to the service(s) 20 and 22. The pressure at the output of the primary pump 12 is sensed at the non-spring end of the second bypass compensator valve 54 as before, but in order for its spool to be in equilibrium with a lighter spring force than for the first bypass compensator valve 48, the spool of the second bypass compensator valve 54 moves to a position determined by the margin and its spring 55. Hence, the second bypass compensator valve 54 is again in a position where the output flow from the secondary pump 16 passes to the tank 32 through a relatively large valve orifice. Thus the output of the secondary pump 16 is maintained at a relatively low pressure. Under these circumstances, the power required from the tractor engine is lower than would normally be required if both pumps 12 and 16 were connected in a more conventional manner.

As the flow required by the services 20 and 22 increases towards the maximum available from the primary pump 12, the engine horsepower savings is reduced. The load-sense relief valve 46 sets a maximum load-sense pressure in the load-sense line 40. This limit of load-sense pressure sets a corresponding limit on the system pressure and the first bypass compensator valve 48 behaves as a relief valve for the primary pump 12.

As the size of the metering orifice in one or both of the first and second directional control valves 28 and 36 increases, the flow to the services 20 and 22 increases proportionately. At the point where the required flow is equal to the capacity of the primary pump 12, the first bypass compensator valve 46 is fully closed. Due to the nature of the spring rate (or slope) characteristic of the first bypass compensator valve 46, the effective margin has reduced. The spring 55 of second bypass compensator valve 54 is arranged so that at a pre-determined point, such as when the first bypass compensator valve 48 closes, the second bypass compensator valve begins to raise appreciable pressure. As a result, at least a portion of the flow from the secondary pump 16 enters the supply line 14 via the check valve 18.

The pressure difference between the pump delivery and the load-sense pressure is now being maintained by the second bypass compensator valve 54.

If the load-sense pressure in line 40 reaches a level dictated by the unloader relief valve 58, then any increase in the load-sense pressure from the directional control valves 28 and 36 no longer is met with a corresponding increase in pump pressure. The unloader relief valve 58 has a pressure-flow characteristic with a steep slope. Therefore, any increase in load-sense pressure above the level set at the unloader relief valve 58 results in a disproportionately lower increase in pressure at the spring end of the second bypass compensator valve 54. This effect is related to the slope of the relief valve characteristic, and the size of the orifice between the load-sense line and that relief valve. Hence, the second bypass compensator valve 54 is pushed towards the open position and the secondary pump 16 is gradually unloaded to a low pressure. This function can also be achieved manually by activating a solenoid operated relief valve 59 to relieve the load-sense pressure acting on the second bypass compensator.

Referring to FIG. 1, it is possible to use the first bypass compensator valve 48 to "time" the application of the load-sense pressure signal to the second bypass compensator valve 54. In this case, the second bypass compensator valve 54 sees only full supply line pressure, which acts on the non-spring end of its spool, and thus remain fully open until a delayed application of the load-sense pressure to the spring end. Hence up to the point of load-sense pressure application to the second bypass compensator valve 54, the second pump 16 experiences virtually no pressure at its output 56 and exerts minimal load on the tractor engine. The power savings are more pronounced even where the fluid flow to the services 20 and 22 approaches the limit of the capacity of the first pump 12.

A further embodiment of the pressure compensation circuit 60 is similar to that in FIG. 1 and is shown in FIG. 3, with the common components being assigned the same reference numerals. The load-sense line 62 from the first directional control valve 28 is connected directly to the pressure compensation circuit 60 and then via the first orifice 42. The load-sense line 64 from the second directional control valve 36 of the second service 22 is connected directly to a third node 65 that is between the second orifice 50 and the second node 52. A third orifice 68 is provided between the second and third nodes 52 and 65. A check valve 66 is connected in parallel with the orifice 68, allowing free flow from node 65 to node to node 62.

By applying the load-sense pressure from the first directional control valve 28 to the second bypass compensator valve 54 via the third orifice 68 in additional to the second orifice 50, it is possible to modify the characteristic of the unloading function of the second bypass compensator valve 54. For example, that unloading function operates at a lower load-sense pressure from the first directional control valve 28 as compared to the load-sense pressure from the second directional control valve 36, where a greater service load may occur.

This is achieved because the maximum load-sense pressure at node 52 whilst activating control valve 22 is set by the flow passing across the orifice 50 but the maximum load-sense pressure at node 52 whilst activating control valve 20 is set by the flow passing across the orifices 50 and 68 in series. In the latter case less flow passes across the relief valve 58 and because this relief valve has a steep pressure rise characteristic it's effective setting is lower. Hence the second bypass compensator valve 54 unloads the second pump 16 at the lower level when control valve 20 is in use compared with control valve 22. Hence the power requirement when using control valve 22 is less than when using control valve 20.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A pressure compensation circuit for a hydraulic system having a primary pump and a secondary pump connected to a supply line, a return line connected to a system tank, at least one hydraulic service connected to the supply line and the return line, and a load-sense circuit which senses a load pressure at each hydraulic service, the pressure compensation circuit comprising:

a check valve connecting the secondary pump to the supply line and preventing fluid flow from the supply line to the secondary pump;

a first bypass compensator valve selectively providing a path between the supply line and the return line in response to pressure in the supply line being greater than pressure in the load-sense circuit by at least a first amount; and a second bypass compensator valve selectively providing a path between the outlet of the secondary pump and the return line in response to pressure in the supply line being greater than pressure in the load-sense circuit by at least a second amount, wherein the second amount is less than the first amount.

2. The pressure compensation circuit as recited in claim 1 further comprising a first orifice coupling the load-sense circuit to a first node to which the first bypass compensator valve is connected; and a second orifice coupling the load-sense circuit to a second node to which the second bypass compensator valve is connected.

3. The pressure compensation circuit as recited in claim 2 further comprising a load-sense relief valve providing a path between the first node and the return line in response to pressure at the first node exceeding a given threshold.

4. The pressure compensation circuit as recited in claim 2 further comprising an unloader relief valve providing a path between an outlet of the secondary pump and the return line in response to pressure at the second node exceeding a given threshold.

5. The pressure compensation circuit as recited in claim 2 further comprising a solenoid operated relief valve providing a path between the second node and the return line when activated.

6. The pressure compensation circuit as recited in claim 1 wherein the load-sense circuit produces a first pressure on a first load-sense line indicating load pressure at a first hydraulic service and produces a second pressure on a second load-sense line indicating load pressure at a second hydraulic service; and further comprising:

a first orifice coupling the first load-sense line to the first bypass compensator valve;

a second orifice coupling the second load-sense line to the second bypass compensator valve; and a third orifice connected between the first load-sense line and the second load-sense line.

7. The pressure compensation circuit as recited in claim 6 further comprising a check valve connected in parallel with the third orifice.

8. The pressure compensation circuit as recited in claim 6 further comprising:

a first node between the first orifice and the first bypass compensator valve;

a second node between the second orifice and the second bypass compensator valve;

a load-sense relief valve providing a path between the first node and the return line in response to pressure at the first node exceeding a given threshold; and an unloader relief valve providing a path between an outlet of the secondary pump and the return line in response to pressure at the second node exceeding a given threshold.

9. A pressure compensation circuit for a hydraulic system having a primary pump and a secondary pump connected to a supply line, a return line connected to a system tank, at least one hydraulic service connected to the supply line and the return line, and having a load-sense circuit producing a pressure on a load-sense line corresponding to a greatest load among each hydraulic service, the pressure compensation circuit comprising:

a first orifice coupling the load-sense line to a first node;

a first bypass compensator valve selectively providing a path between the supply line and the return line in response to pressure in the supply line being greater than pressure at the load-sense line;

a second orifice coupling the load-sense line to a second node; and a second bypass compensator valve selectively providing a path between the outlet of the secondary pump and the return line in response to pressure in the supply line being greater than pressure at the second node.

10. The pressure compensation circuit as recited in claim 9 further comprising a load-sense relief valve providing a path between the first node and the return line in response to pressure at the first node exceeding a given threshold.

11. The pressure compensation circuit as recited in claim 9 further comprising an unloader relief valve providing a path between an outlet of the secondary pump and the return line in response to pressure at the second node exceeding a given threshold.

12. A pressure compensation circuit for a hydraulic system having a primary pump and a secondary pump connected to a supply line, a return line connected to a system tank, at least one hydraulic service connected to the supply line and the return line, and having a load-sense circuit producing a first pressure on a first load-sense line indicating load pressure at a first hydraulic service and producing a second pressure on a second load-sense line indicating load pressure at a second hydraulic service, the pressure compensation circuit comprising:

a first orifice coupling the first load-sense line to a first node;

a second orifice coupling the second load-sense line to a second node;

a third orifice coupling the first load-sense line to the second load-sense line;

a first bypass compensator valve selectively providing a path between the supply line and the return line in response to pressure in the supply line being greater than pressure at the first load-sense; and a second bypass compensator valve selectively providing a path between the outlet of the secondary pump and the return line in response to pressure in the supply line being greater than pressure at the second node.

13. The pressure compensation circuit as recited in claim 12 further comprising a check valve connected in parallel with the third orifice.

14. The pressure compensation circuit as recited in claim 12 further comprising a load-sense relief valve providing a path between the first node and the return line in response to pressure at the first node exceeding a given threshold.

15. The pressure compensation circuit as recited in claim 12 further comprising an unloader relief valve providing a path between an outlet of the secondary pump and the return line in response to pressure at the second node exceeding a given threshold.

16. A hydraulic system comprising;

a supply line for connection to at least one hydraulic service;

a return line for connection to each hydraulic service;

a primary pump connected to the supply line;

a secondary pump connected by a check valve to a supply line;

a load-sense circuit producing a pressure on a load-sense line corresponding to a greatest load among each hydraulic service;

a first orifice coupling the load-sense line to a first node;

a first bypass compensator valve selectively providing a path between the supply line and the return line in response to pressure in the supply line being greater than pressure at the first node;

a second orifice coupling the load-sense line to a second node; and a bypass compensator valve selectively providing a path between the second outlet of the secondary pump and the return line in response to pressure in the supply line being greater than pressure at the second node.

17. The pressure compensation circuit as recited in claim 16 further comprising a load-sense relief valve providing a path between the second node and the return line in response to pressure at the first node exceeding a given threshold.

18. The pressure compensation circuit as recited in claim 16 further comprising an unloader relief valve providing a path between an outlet of the secondary pump and the return line in response to pressure at the second node exceeding a given threshold.

19. The pressure compensation circuit as recited in claim 16 further comprising a solenoid operated relief valve providing a path between the first node and the return line when activated.

20. The pressure compensation circuit as recited in claim 16 further comprising a check valve coupling the secondary pump outlet to the supply line and allowing fluid to flow only from the secondary pump to the supply line.

* * * * *

UNITED STATES PATENT AND TRADEMARK OFFICE

CERTIFICATE OF CORRECTION

PATENT NO. : 6,901,754 B2
DATED : June 7, 2005
INVENTOR(S) : Mark J. Jervis

It is certified that error appears in the above-identified patent and that said Letters Patent is hereby corrected as shown below:

Column 8,
Line 4, after “load-sense” insert -- line --.
Line 27, change “a supply” to -- the supply --.
Line 39, change “a bypass compensator” to -- a second bypass compensator --.
Line 40, delete “second”.
Line 45, change “second” to -- first --.
Line 54, change “first” to -- second --.

Signed and Sealed this

Twenty-seventh Day of September, 2005

JON W. DUDAS
*Director of the United States Patent and Trademark Office*